(12) United States Patent
Kuroda et al.

(10) Patent No.: US 7,279,683 B2
(45) Date of Patent: Oct. 9, 2007

(54) DISTANCE MEASUREMENT APPARATUS OF GAMMA RAY SOURCE USING MULTILAYERED RAY DETECTOR

(75) Inventors: Yoshikatsu Kuroda, Aichi-ken (JP); Tadayuki Takahashi, Kanagawa-ken (JP); Shin Watanabe, Kanagawa-ken (JP)

(73) Assignees: Mitsubishi Heavy Industries, Ltd., Tokyo (JP); Japan Aerospace Exploration Agency, Tokyo (JP)

( * ) Notice: Subject to any disclaimer, the term of this patent is extended or adjusted under 35 U.S.C. 154(b) by 36 days.

(21) Appl. No.: 10/421,709

(22) Filed: Apr. 24, 2003

(65) Prior Publication Data

US 2004/0001570 A1    Jan. 1, 2004

(30) Foreign Application Priority Data

Apr. 24, 2002   (JP) .............................. 2002-122524

(51) Int. Cl.
*G01J 5/02*        (2006.01)
(52) U.S. Cl. .......................... 250/339.06; 250/370.09; 250/370.01; 250/370.06; 250/370.08; 250/370.13; 250/363.01; 250/363.05; 250/363.09; 250/397; 250/338.4; 250/366; 250/369
(58) Field of Classification Search .......... 250/339.06, 250/370.09, 370.01, 370.06, 370.08, 370.13, 250/363.01, 363.05, 363.09, 397, 338.4, 250/366, 369
See application file for complete search history.

(56) References Cited

U.S. PATENT DOCUMENTS

| | | | |
|---|---|---|---|
| 4,825,073 A * | 4/1989 | Smith et al. ................. | 250/260 |
| 4,857,737 A * | 8/1989 | Kamae et al. ......... | 250/370.09 |
| 5,412,206 A | 5/1995 | Seidel et al. | |
| 5,821,541 A * | 10/1998 | Tumer .................... | 250/370.09 |
| 6,420,711 B2 * | 7/2002 | Tumer .................... | 250/370.09 |
| 6,448,560 B1 * | 9/2002 | Tumer .................... | 250/370.09 |
| 6,621,084 B1 * | 9/2003 | Wainer et al. ......... | 250/370.09 |
| 6,727,505 B2 * | 4/2004 | Benke et al. ................ | 250/393 |
| 6,740,885 B2 * | 5/2004 | Wainer et al. ......... | 250/370.09 |
| 6,791,090 B2 * | 9/2004 | Lin et al. .................... | 250/367 |

FOREIGN PATENT DOCUMENTS

| | | |
|---|---|---|
| JP | 61-212783 A | 9/1986 |
| JP | 62-217180 A | 9/1987 |
| JP | 63-158490 A | 7/1988 |
| JP | 7-294652 A | 11/1995 |
| JP | 11-307032 A | 11/1999 |
| JP | 2003-142670 A | 5/2003 |

OTHER PUBLICATIONS

Watanabe, Shin et al., "Stacked CdTe gamma-ray detector and its application to a range finder," Nuclear Instruments and Methods in Physics Research, 2003, pp. 118-121, A 505, Elsevier Science B.V.

* cited by examiner

*Primary Examiner*—David Porta
*Assistant Examiner*—Christine Sung
(74) *Attorney, Agent, or Firm*—Birch, Stewart, Kolasch & Birch, LLP

(57) ABSTRACT

Rays incident upon a plurality of detection plates arranged along a normal direction are detected. A distance between the ray and the ray source is estimated based on the number of counted rays detected by each detection plate, and each interval distance of the detection plates. Moreover, the direction of the source of the ray is estimated based on each image obtained from each detection plate.

17 Claims, 8 Drawing Sheets

(Top plan view)

(Bottom plan view)

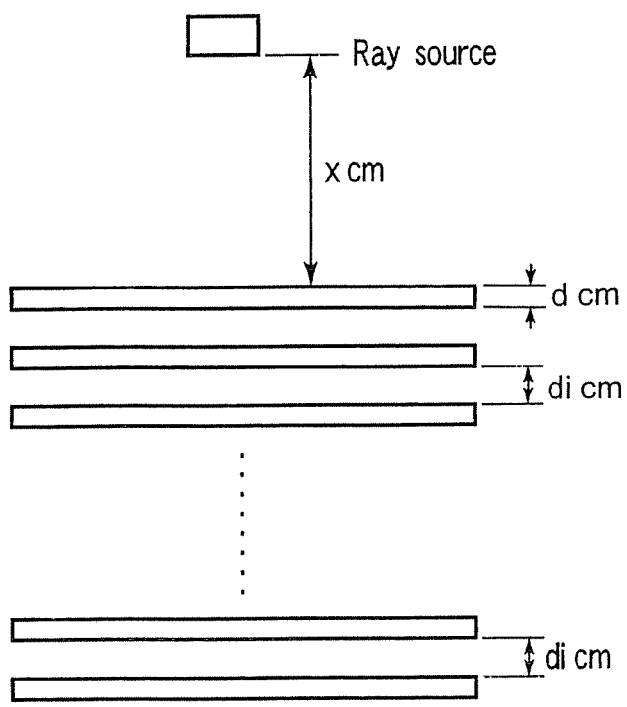
FIG. 10
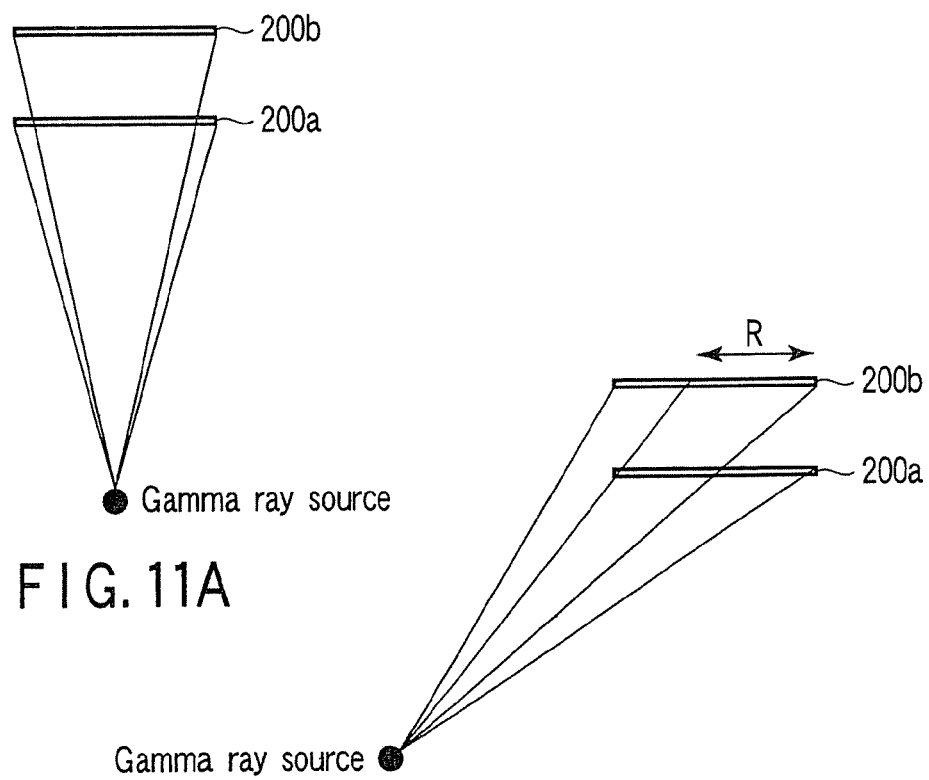
FIG. 11A
FIG. 11B

DISTANCE MEASUREMENT APPARATUS OF GAMMA RAY SOURCE USING MULTILAYERED RAY DETECTOR

CROSS-REFERENCE TO RELATED APPLICATIONS

This application is based upon and claims the benefit of priority from the prior Japanese Patent Application No. 2002-122524, filed Apr. 24, 2002, the entire contents of which are incorporated herein by reference.

BACKGROUND OF THE INVENTION

1. Field of the Invention

The present invention relates to a distance measurement apparatus of a gamma ray source, using a multilayered ray detector.

2. Description of the Related Art

A radiation detection system, which detects rays such as hard X-rays and γ-rays to generate image information, is used in various technical fields. For example, when a radiation field from a certain celestial body is detected, the physical state or structure of the celestial body can be studied. Moreover, when a human body is irradiated with X-rays, and the transmitted waves are analyzed, it is possible to acquire a tomographic image. This system is also used in other fields, such as atomic energy (glass solidification inspection of radiation waste, radiation monitoring apparatuses, and the like), nondestructive testing (semiconductor inspection apparatuses), and a resource search field mineral exploration (underground exploration).

However, in most of the related-art radiation detection systems, radiation energy is measured based on photons impacting on a detector surface, for forming an image. It is not possible to measure the direction the rays are traveling in, or the distance to the ray source, using this type of detection system.

With regard to measuring distance from the ray source, techniques such as that disclosed in Jpn. Pat. Appln. KOKAI Publication No. 7-294652, are known. In this technique, two detectors are arranged, for counting the number of incident gamma rays in a predetermined positional relation, and distance to the gamma ray source is estimated based on the ratio of numbers of rays received by each detector. When the gamma ray source exists right under a detector, the distance can be obtained. However, when the gamma ray source does not exist right under the detector, the detection value becomes indefinite because of a dead angle, and the distance to the ray source cannot be obtained with a high precision.

SUMMARY OF THE INVENTION

The present invention has been developed in consideration of the above-described circumstances, and provides a distance measurement apparatus of a gamma ray source using a multilayered ray detector, capable of measuring the direction of the ray source, or the distance to the ray source with high precision.

According to a first aspect of the present invention, there is provided a distance measurement apparatus of an X-ray or gamma ray source using a multilayered radiation detector, comprising: a plurality of detection plates which are disposed along a normal direction and which generate signals on the basis of interaction with incident X-ray or gamma ray photons; a number count unit which counts each number of the X-ray or gamma ray photons interacting with each of the plurality of detection plates on the basis of the signals generated by each of the plurality of detection plates; and a distance calculation unit which calculates a distance between the distance measurement apparatus and the X-ray or gamma ray source on the basis of each number of the X-ray or gamma ray photons and each interval distance between the plurality of detection plates.

According to a second aspect of the present invention, there is provided a distance measurement apparatus of an X-ray or gamma ray source using a multilayered radiation detector, comprising: a plurality of detection plates which are disposed along a normal direction and which generate signals on the basis of interactions with incident X-ray or gamma ray photons; a number count unit which counts each number of the X-ray or gamma ray photons interacting with each of the plurality of detection plates and detects positions of the interactions on each of the detection plates on the basis of the signals generated by each of the plurality of detection plates and acquires intensity distribution of the X-ray or gamma ray photons on each of the detection plates; and a direction acquisition unit which acquires an incident direction of the ray with respect to the apparatus based on each number of the X-ray or gamma ray photons and the intensity distribution.

According to a third aspect of the present invention, there is provided a distance measurement apparatus of an X-ray or gamma ray source using a multilayered radiation detector, comprising: a plurality of charge-coupled imaging devices disposed along a normal direction, which generate signals on the basis of interaction with incident X-ray or gamma ray photons and which count each number of the X-ray or gamma ray photons interacting with each of the plurality of charge-coupled imaging plates based on the signals; and a calculation unit which calculates a distance between the distance measurement apparatus and the X-ray or gamma ray source on the basis of the each number of the X-ray or gamma ray photons and each interval distance between the plurality of the charge-coupled imaging plates.

BRIEF DESCRIPTION OF THE DRAWINGS

FIG. 10 is a concept diagram showing a calculation process for obtaining a distance to the gamma ray source, realized by the present system; and FIGS. 11A, 11B are explanatory views of a gamma ray source direction measurement process of the present system.

DETAILED DESCRIPTION OF THE INVENTION

Figure 1:
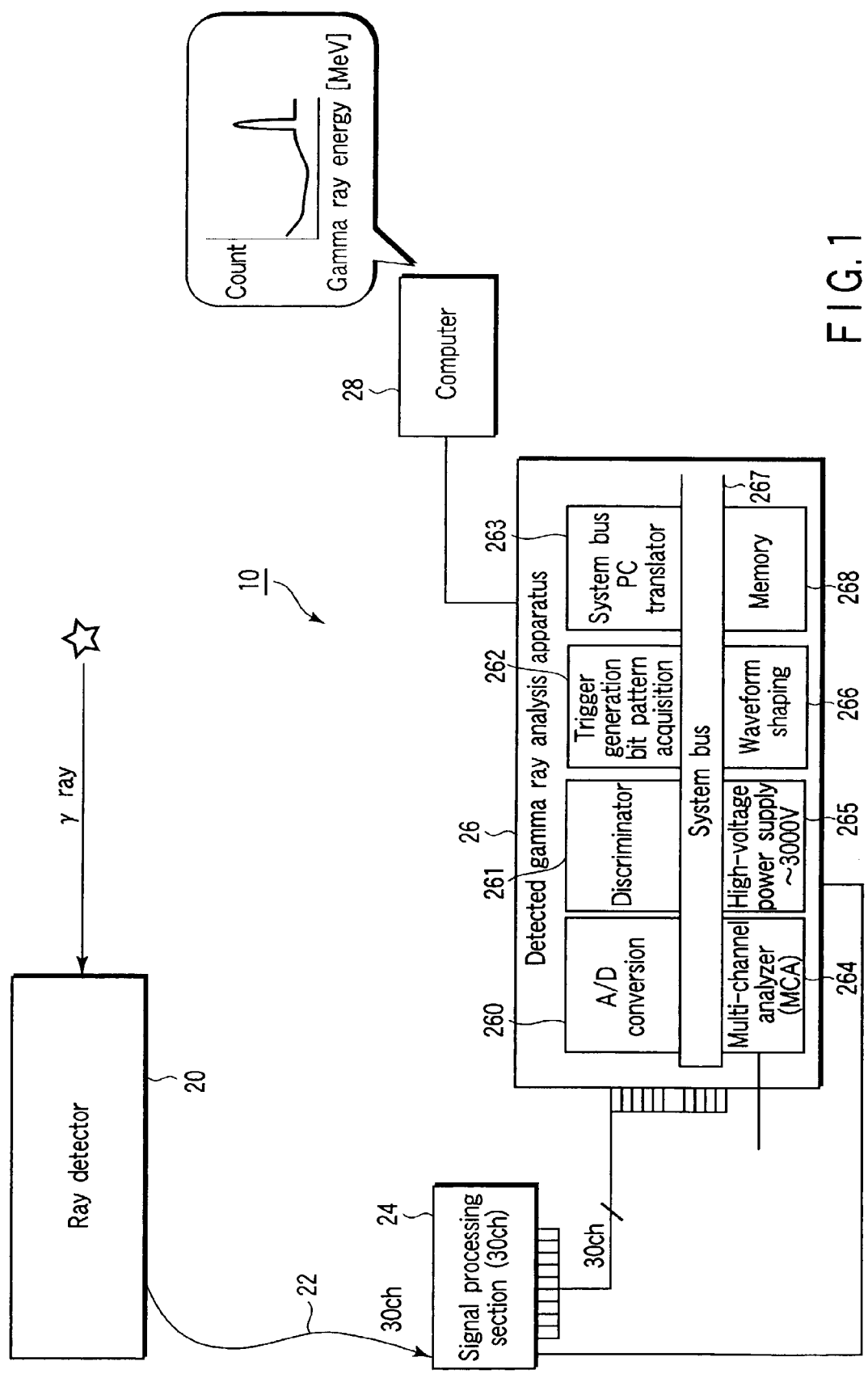
FIG. 1 shows a distance measurement apparatus 10 according to the present embodiment.

An embodiment of the present invention will be described hereinafter. In the following description, constituting elements having substantially the same function and constitution are denoted with the same reference numerals, and are not described unless necessary.

FIG. 1 is a diagram showing a distance measurement apparatus 10 of a gamma ray source using a multilayered ray detector according to the present embodiment. As shown in FIG. 1, the distance measurement apparatus 10 comprises a ray detector 20, signal processing section 24, detected gamma ray analysis unit 26, and computer 28.

The ray detector 20 detects rays, such as X rays or γ rays. The ray detector 20, described in more detail later, has a structure in which a plurality of detection plates, which act as detection surfaces, are stacked in a ray incidence direction. Each detection plate can independently move along the ray incidence direction. The signal processing section 24 amplifies the signal produced by the ray detector 20, i.e. the detection signal, and prevents lowering of the S/N ratio. Moreover, the signal processing section 24 performs signal processing, comprising: sampling and further amplifying the detection signal; generating a trigger signal, and holding a sample.

The detected gamma ray analysis unit 26 includes an A/D conversion section 260, discriminator 261, trigger signal generation bit pattern acquisition section 262, system bus PC translator 263, multi channel analyzer (MCA) 264, high-voltage power supply 265, waveform shaping section 266, and system bus 267.

The A/D conversion section 260 converts an inputted analog signal to a digital signal.

The discriminator 261 extracts an original signal wave from a signal wave subjected to frequency modulation or phase modulation.

The trigger signal generation bit pattern acquisition section 262 acquires a bit pattern of a detected gamma ray based on the signal wave extracted by the discriminator 261. Detection information of the gamma ray acquired by this trigger signal generation bit pattern acquisition section 262 is transmitted to the computer 28 to measure the distance to the gamma ray source or to measure the direction as described later. The trigger generation bit pattern may also be acquired by the computer 28.

The system bus PC translator 263 is a transmitter for transmitting various signals to the computer 28 via the system bus 267.

The multi channel analyzer (MCA) 264 histogram-processes a signal value of the digital signal converted by the A/D conversion section 260.

The high-voltage power supply 265 generates a high voltage, which is applied to the electrode of each detection plate of the ray detector 20. For each detector plate in which the voltage is supplied to the electrode from the high-voltage power supply 265, when the plate is a semiconductor, and the gamma ray is incident, an electron and hole are generated. If the plate is a scintillator, the lights of a region to an ultraviolet ray from visible ray are generated on the basis of the incident gamma ray.

The waveform shaping section 266 converts a waveform of an input pulse to a predetermined waveform along an amplitude axis or time axis.

The system bus 267 is a circuit for transmitting/receiving various signals among devices inside the detected gamma ray analysis unit 26.

A memory 268 stores the bit pattern of the gamma ray acquired by the trigger signal generation bit pattern acquisition section 262.

The computer 28 functions as a work station for numerical processing or image processing, or a personal computer. The computer 28 executes measurement of the energy distribution of the detected gamma rays shown in FIG. 1, gamma ray source distance, or gamma ray source direction, described later.

Note that the detected gamma ray analysis unit 26 may further include a numerical or image processing function. The detected gamma ray analysis unit 26 may also be constituted to execute gamma ray source distance measurement, described later.

(Ray Detector)

Next, the ray detector 20 will be described in detail.

Figure 2:
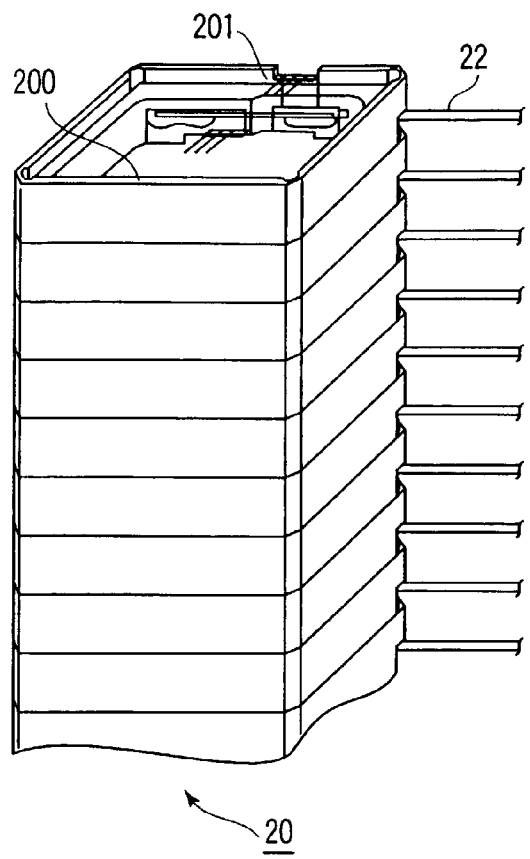
FIG. 2 is an appearance view in perspective of a ray detector 20.
Figure 3:
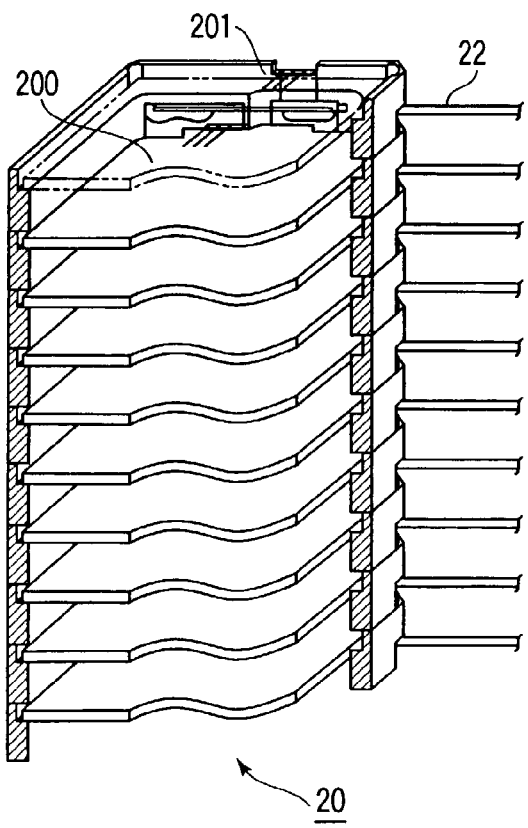
FIG. 3 is an explanatory view of an inner constitution of the ray detector 20 shown in FIG. 2.
Figure 4A:
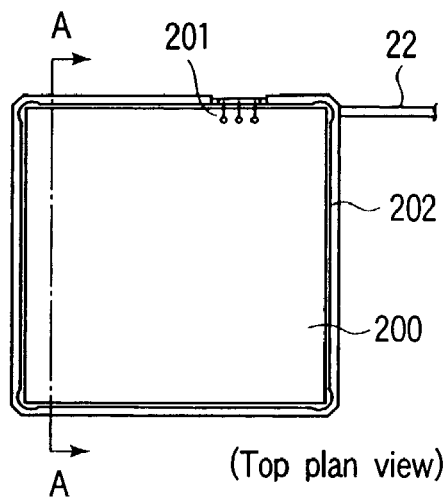
FIG. 4A is a top plan view of the ray detector 20.
Figure 4B:
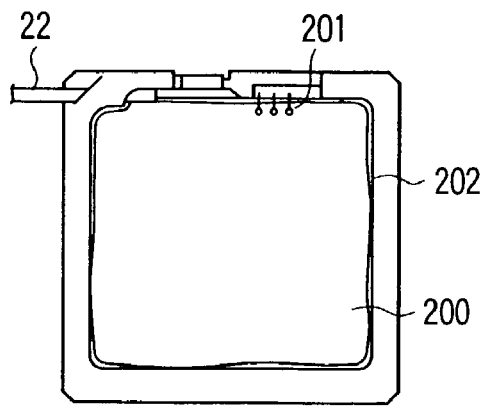
FIG. 4B is a bottom view.
Figure 4C:
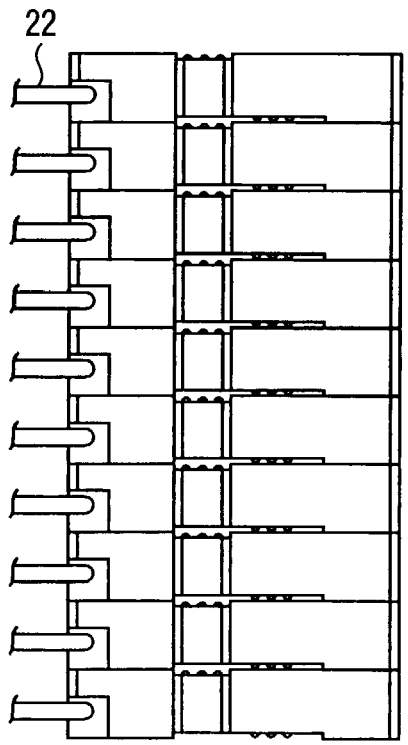
FIG. 4C is a rear view.
Figure 4D:
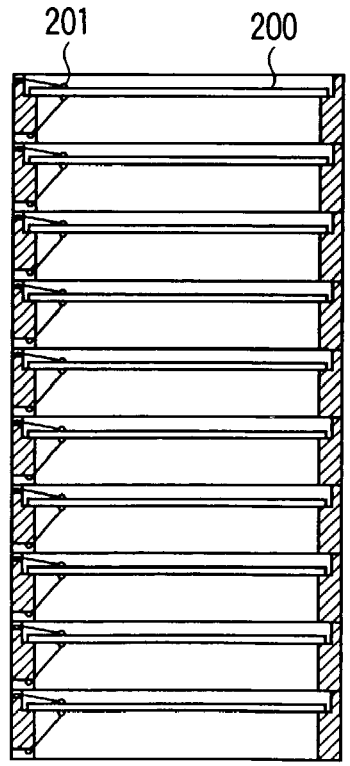
FIG. 4D is a sectional view taken along A-A in FIG. 4A.

FIG. 2 is an appearance view in perspective of the ray detector 20, and FIG. 3 is an explanatory view of the inner structure of the ray detector 20 shown in FIG. 2. Moreover, FIG. 4A is a top plan view of the ray detector 20, FIG. 4B is a bottom plan view, FIG. 4C is a rear view, and FIG. 4D is a sectional view taken along line A-A in FIG. 4A.

As shown in 2, 3, 4A and 4B, the ray detector 20 includes a plurality of detection plates 200, and a first electrode 201 and second electrode 202 for collecting electric charges generated when a ray is incident upon each detection plate 200. One of the first and second electrodes is allotted to an anode, and the other is allotted to a cathode. Note that the ray detector 20 is connected to the detected gamma ray analysis unit 26 by a connector 22. The electric charges collected by the electrodes are transmitted to the subsequent-stage detected gamma ray analysis unit 26 for each detection plate 200 (each channel) (see FIG. 4C).

The present ray detector 20 includes an electric charge collection mechanism for each detection plate 200. Therefore, the position, i.e., the place on the detection plate 200, where the gamma ray caused a reaction, and the energy of the ray can be independently known. Moreover, the distance to the ray source can be known.

That is, in the present detector 20, the energy distribution of the incident gamma ray or an energy value of a line gamma ray can be known from energy spectra of gamma rays detected in the respective detection plates 200 or a sum of the spectra. Moreover, in general, the gamma ray having a single energy (line gamma ray) is required to measure the distance to the ray source. When the distance to the ray source is measured in the present detector 20, only a phenomenon in which the energy equal to that of the incident gamma ray is detected in any plate 200 (only one layer) is selected. The number of detected phenomena for each plate 200 is compared with another number. By this comparison, the distance of the line gamma ray from the detector can be known.

Note that when each plate 200 is constituted of a semiconductor detector, it is possible to apply individual potentials to the respective plates by the first and second electrodes 201, 202.

Each detection plate 200 is a semiconductor plate of semiconductors, such as CdTe and Cd. In addition to the semiconductor, scintillators (such as NaI, Ge, GsO, BGO) can be used. Furthermore, a plurality of charge-coupled imaging devices to detect X-rays and gamma rays can be used as each detection plate 200.

Note that the detection plate 200 according to the present embodiment is a plane type of semiconductor and so does not acquire image. This is the reason from the viewpoint of enhancement of a screen factor as shown in FIGS. 2, 3. By this constitution, it is possible to count the number of incident gamma rays with a high precision and to detect the energy (spectrum analysis). However, the detection plate 200 is not limited to the plane type shown in FIGS. 2, 3, and may also be constituted so that the image can be acquired.

Figure 5A:
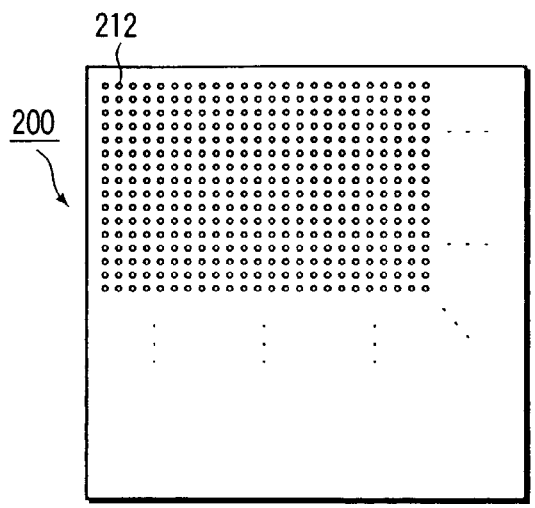
FIGS. 5A, 5B are diagrams showing modification examples of a detection plate 200.
Figure 5B:
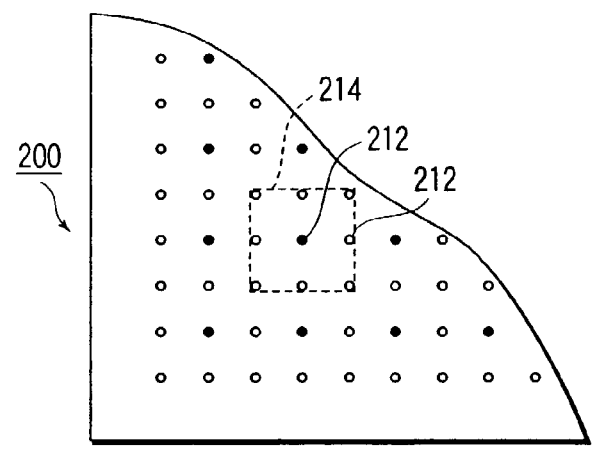
Figure 6A:
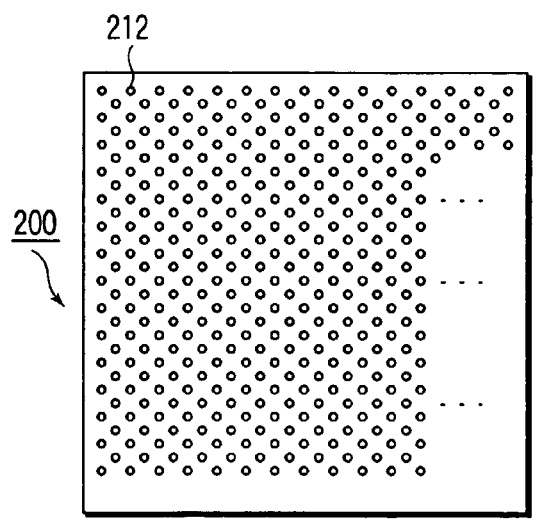
FIGS. 6A, 6B are diagrams showing modification examples of the detection plate 200.
Figure 6B:
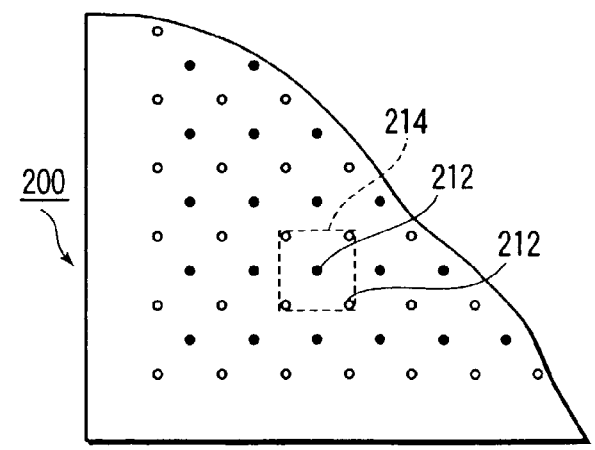

FIGS. 5A, 5B, 6A, 6B show examples of the detection plate 200 in which the image can be acquired. As shown in FIGS. 5A, 6A, hole type electrodes 212 may be formed at a predetermined pitch in the detection plate 200. Here, the detection plate 200 is formed of semiconductors such as cadmium telluride (CdTe) and zinc cadmium telluride (CdZnTe) or scintillator, and has a predetermined thickness. In the plate 200 of this constitution, as shown in FIGS. 5B, 6B, the electrodes 212 are divided into anodes (black holes) and cathodes (white holes) in a predetermined mode. The divided anodes and cathodes and the semiconductor of a part of the plate 200 form a sensor element 214.

A semiconductor plate including this hole type electrode, and a ray detector including the plate are described in detail in Jpn. Pat. Appln. No. 2001-339711.

In FIGS. 3, 4D, the detection plates 200 are stacked at predetermined intervals along the ray incidence direction. The number of stacked detection plates 200 is not limited, but at least two plates are necessary for realizing measurement of the direction of the ray source of the detector 20, described later, or measurement of the distance to the ray source from the detector 20. The respective detection plates 200 can be individually moved along the ray incidence direction, and the position of the plate (i.e., the distance interval between the detection plates 200) is determined by a measurement process, described later. The movement mechanism of the detection plate 200 may also be of any type, such as manual, electromotive, or mechanical.

Figure 7:
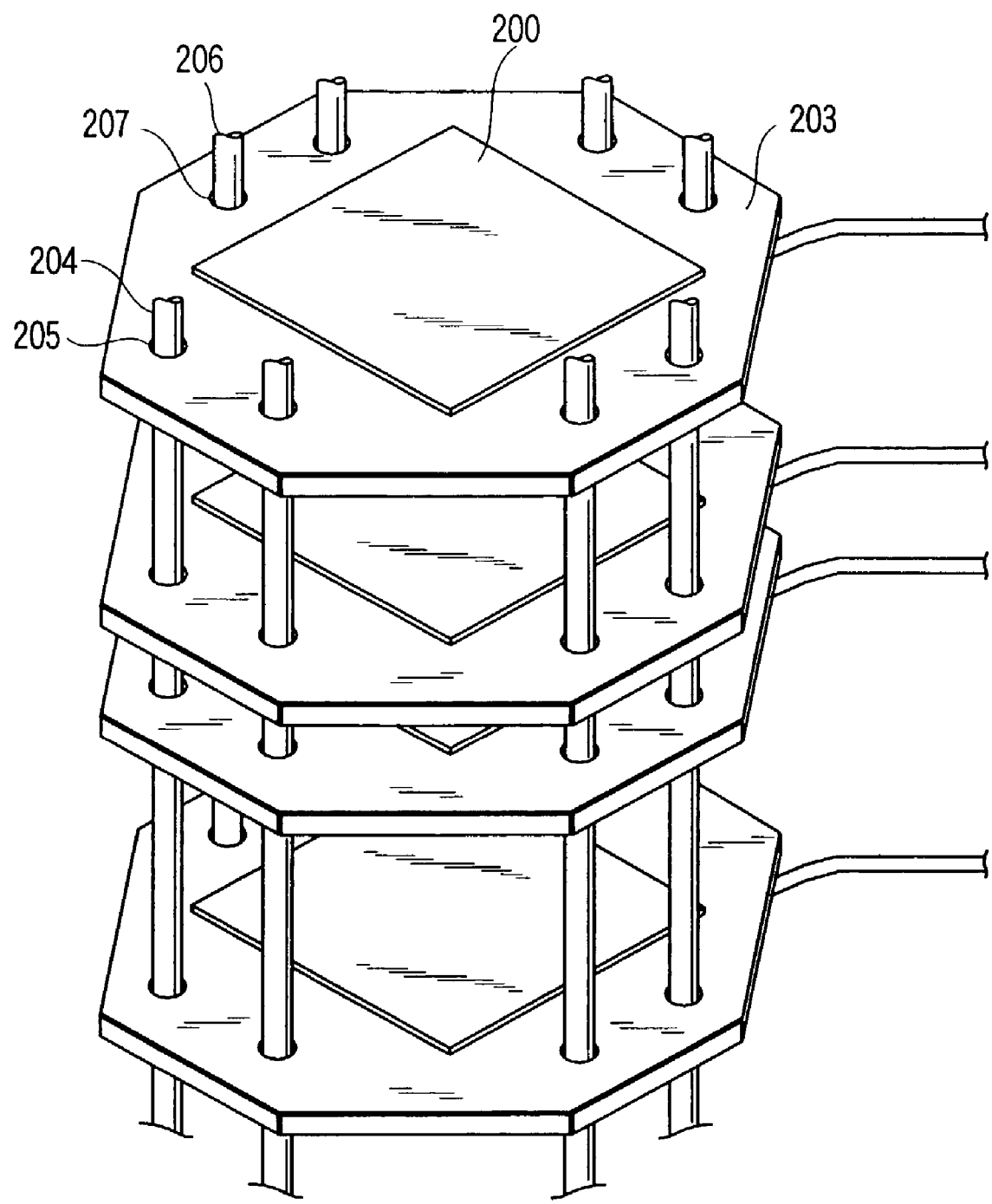
FIG. 7 is a diagram showing one example of a movement mechanism of the detection plate 200.
Figure 8:
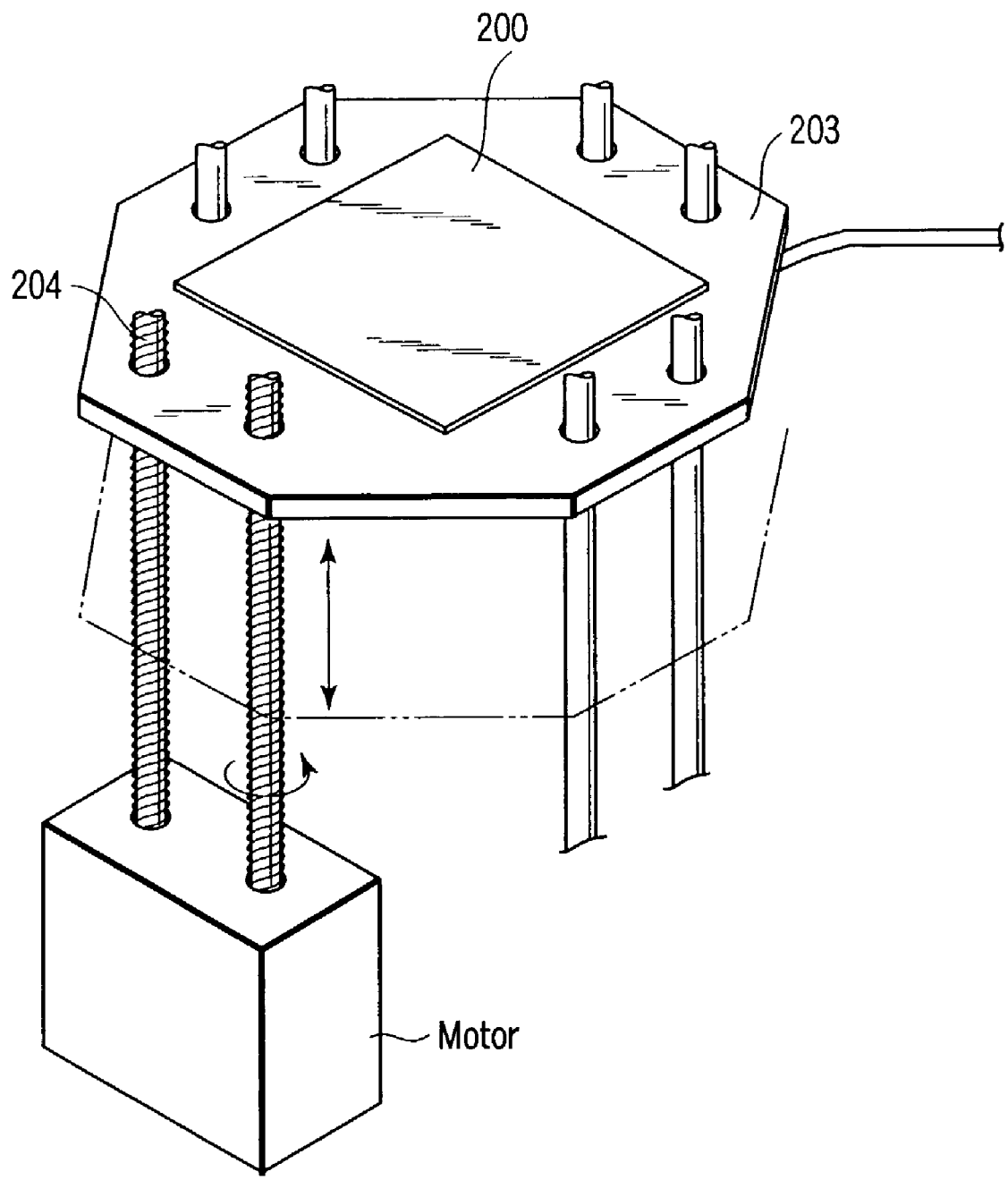
FIG. 8 is a diagram showing one example of the movement mechanism of the detection plate 200.

FIGS. 7 and 8 are diagrams showing one example of the movement mechanism of the detection plate 200. As shown in FIG. 7, the substrates for mounting the detection plates 200, i.e. mounting substrates 203 are moved via screw shafts 204 and screw holes 205, and guide shafts 206 and bearing holes 207. The screw shafts 204 may be rotated manually or by an electric motor, as shown in FIG. 8. Moreover, the mount substrate 203 can be moved by providing a minimum of one screw shaft 204 and screw hole 205. Therefore, the remaining shafts shown in FIG. 7 may optionally be allotted to the screw shaft 204 or guide shaft 206. To realize movement with a higher precision, a ball screw mechanism may also be employed.

Note that the distance between the detection plates 200 moved by the movement mechanism is detected by a position detection apparatus (not shown). The method of detection may be of any type. For example, an optical detector, a mechanical detector disposed for each detection plate 200, a magnetic system, a brush type, or a photoelectric type may be used. Any type, such as a so-called absolute encoder, rotary encoder, or linear encoder may also be used.

(Gamma Ray Source Distance Measurement Process)

Next, a gamma ray source distance measurement process realized by a system including the ray detector constituted as described above will be described with reference to FIGS. 9 and 10. To simplify description, the ray source is assumed to radiate the rays equally in all directions ($4\pi$).

Figure 9:
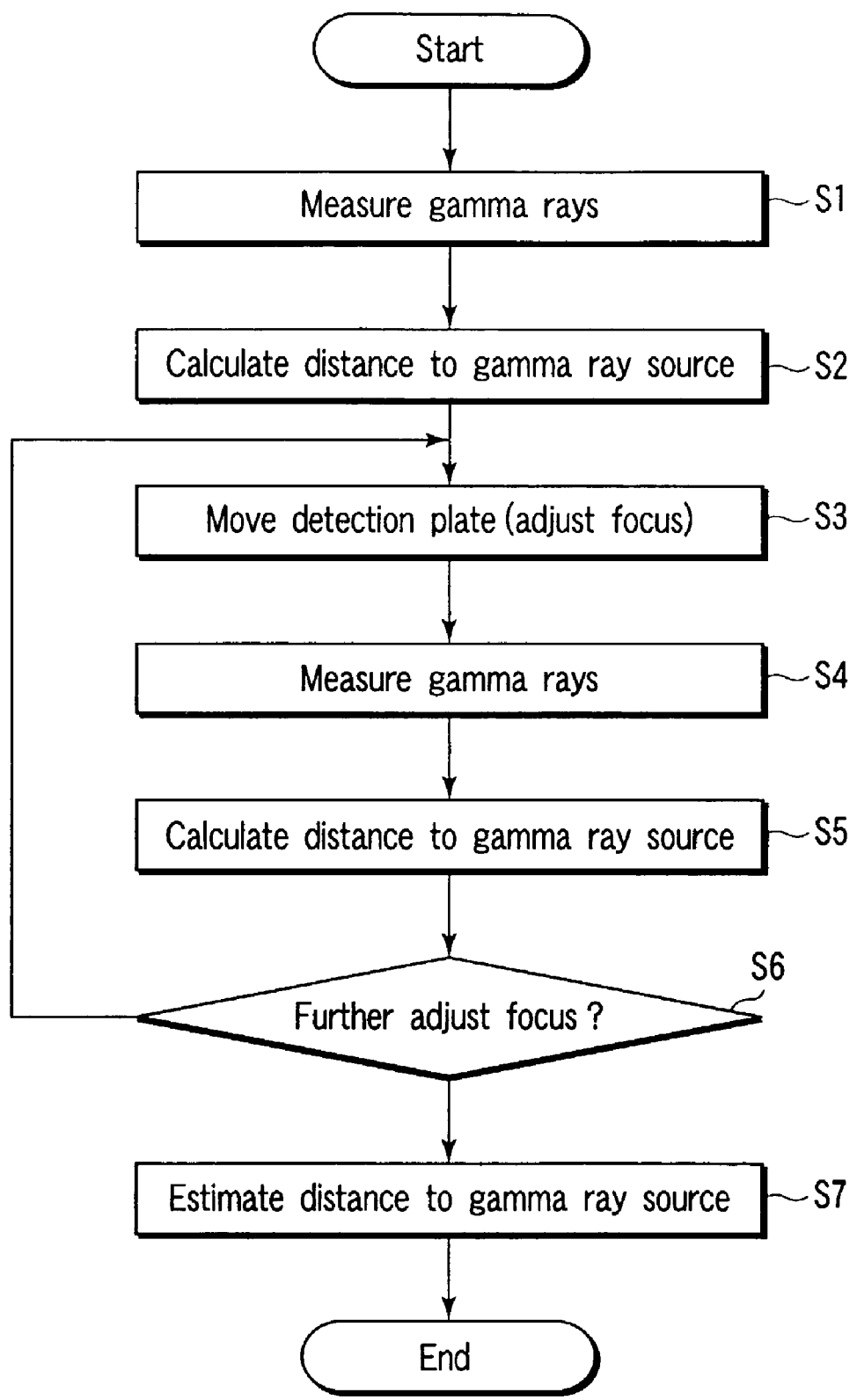
FIG. 9 is a flowchart showing a procedure of a gamma ray source distance measurement process.

FIG. 9 is a flowchart showing a procedure of the gamma ray source distance measurement process. In FIG. 9, the procedure comprises: first directing a ray incident surface (detection surface) of the ray detector 20 in a predetermined direction; detecting the gamma ray incident upon the detector 20 (step S1); and performing a calculation process for obtaining the distance to the gamma ray source based on the detected data (step S2). The calculation process executed in this step S2 is as follows.

FIG. 10 is a concept diagram showing a calculation process for obtaining a distance to the gamma ray source, realized by the present system. As shown in FIG. 10, it is assumed that a distance to the ray source from the ray detector 20 to be obtained by the present distance measurement is x cm, a pitch between the detection plates is di and a thickness of each detection plate is d cm. A pitch $d_i$ is a known amount measured by the position detection apparatus (not shown).

In the present gamma ray source measurement process, the distance x to the ray source is obtained as x by which a value of $\chi^2$ is minimized by the following equation (1).

$$\chi^2 = \Sigma(C_i - CE_i)^2/\sigma^2 \quad (1),$$

wherein a sum with respect to i is obtained up to the number n of intervals of the detection plate 200 from 1. Moreover, $C_i$ is the number of counts detected by the detection plate 200 of an i-th layer. Furthermore, $CE_i$ is the number of detections expected in the detection plate 200 of the i-th layer, and is represented by a function, for example, shown in the following equation (2).

$$CE_i = I_0 \exp[-\mu(i-1)d] \times (1-\exp[-\mu_p d])(x/[x+(i-1)di])^2 \quad (2),$$

wherein $I_0$ is the number of rays with which a surface layer (i.e., i=first layer) is irradiated, $\mu$ is a sectional area (photoelectric absorption and Compton effect) of a material for use in the detection plate 200, and $\mu_p$ means the sectional area of the photoelectric absorption. Furthermore, $\exp[-\mu(i-1)d]$ indicates an effect that the incident gamma ray causes reaction on the upper detection plate (i.e., the already passed detection plate). $(x/[x+(i-1)di])^2$ corresponds to an effect that the distance to the ray source differs for each detection plate 200. The reason why this coefficient is introduced is that the gamma ray is absorbed by the detection plate 200 itself, and this influence is taken into account to perform accurate distance measurement.

In the present calculation process, the distance x is calculated such as the value of $\chi^2$ of the equation (1) is minimized by a minimum square method. Concretely, by the calculation of the computer 28, a set of x and $I_0$ is obtained at which the value of $\chi^2$ is minimum from the equation (1).

Next, the procedure comprises: moving at least one or more detection plates 200 along the incidence direction of the gamma ray; adjusting the distance interval between the detection plates 200 (step S3); detecting the gamma ray incident upon the detector 20 under the new setting of the detection plate 200 (step S4); and performing the calculation process for obtaining the distance to the gamma ray source based on the detection data (step S5). Note that the calculation process in step S5 is similar to that in step S2.

Next, it is determined whether or not the gamma ray detection/distance calculation process is executed in the state after the movement of the detection plate 200 (step S6). When it is determined the gamma ray detection/distance calculation process is executed, the process of the steps S3 to S5 is repeated.

The gamma ray source distance measurement in the setting obtained by moving the detection plate 200 as executed by the steps S3 to S5 functions in the same manner as in focus adjustment as follows. That is, to estimate the distance from the number of gamma rays reacted and detected in each detection plate 200 with high precision (to estimate the distance with high resolution), it is necessary to appropriately set the distance interval between the detection plates 200 in accordance with the distance to the gamma ray source. For example, assume that the first case in which although the distance x to the gamma ray source to be obtained is large, the distance interval between the detection plates 200 is set to be very small. In this case, much difference is not generated in the number of counts in each detection plate 200, and indefiniteness of direction estimate increases. On the other hand, assume that the second case in which although the distance x to the gamma ray source to be obtained is small, the distance interval between the detection plates 200 is set to be very large. Then, the number of detected counts of the detection plate 200 of a deep lower layer from the gamma ray incident surface decreases, and does not have any meaning. In the present system, by the process of steps S1, S2 and the process of steps S3 to S5, the distance interval between the detection plates 200 is set according to the distance to the gamma ray source. When a so-called "focus adjustment" is performed, an optimum interval distance can be estimated.

When the gamma ray detection/distance calculation process is judged not to be executed in the step S6, the minimum x in the calculated ray source distances is estimated as the distance to the gamma ray source (step S7), and the present distance measurement process ends.

(Gamma Ray Source Direction Measurement Process)

Next, a gamma ray source direction measurement process realized by the system including the ray detector constituted described above will be described with reference to FIGS. 11A, 11B. It is assumed, for the sake of simplicity that the radiation of the ray source is unidirectional (4π) and uniform, as in distance measurement, described above. Moreover, in the present direction measurement process, it is assumed that the detection plate 200 can acquire the image.

FIGS. 11A, 11B are explanatory views of the gamma ray source direction measurement process of the present system. The drawings show an example in which the detection plate 200 is constituted of two layers, to simplify the description. As shown in FIG. 11A, when the gamma ray source is in the front surface, with respect to the ray detector 20 (detection plate 200), the interval acquired by each detection plate 200 is uniform, and the detected energy differs. In this case, it is seen that the gamma ray source is in a laminate direction of the detection plate 200.

Moreover, as shown in FIG. 11B, when the gamma ray source is not in the front surface with respect to the ray detector 20 (detection plate 200), for example, a region R of shade is formed in two detection plates 200b. The direction of the gamma ray source can be known based on the image information detected by a detection plate 200b in which the shade is generated. That is, since the gamma ray strength of the region R weakens, the direction of the gamma ray source can be estimated. Furthermore, when the distance to the gamma ray source is known, the above-described distance measurement process may be executed.

In this manner, according to the present gamma ray source distance measurement process and direction measurement process, it is possible to obtain three-dimensional position and distance of the gamma ray source without moving the detector 20. This effect is especially useful if it is difficult to move the detector, and the ray source has to be searched over a broad region, as in monitoring a nuclear reactor.

Note that the usage of the present system is not limited to the above-described example. For example, it may comprise: obtaining the direction of the gamma ray source, for example, according to the direction measurement process; rotating the detector 20 so that the direction is the front surface; and performing the gamma ray source direction measurement process.

According to the above-described constitution, the following effect can be obtained: According to the present system, it is possible to estimate, with high precision, the distance to a gamma ray source, regardless of the position of the ray source with respect to the detector 20.

Moreover, in the present system, the absorption of the detection plate 200 itself is considered and the distance calculation is performed based on the measured value of each detection plate 200, and the distance to the gamma ray source can be estimated with high precision.

Moreover, in the present system, the energy of the incident gamma ray can also be known. Therefore, for example, when a gamma ray of a constant energy is radiated from the ray source, it is also possible to measure the distance. The measurement is executed by utilizing the phenomenon in which the energy of the gamma ray completely disappears in the specific detection plate 200.

Furthermore, the present system has a constitution in which the detection plates 200 are stacked. The respective plates 200 of this multiple layers function as shields with one another. By this function, Compton scattering, caused by the gamma ray in the detector, can be removed, and measurement with a very high S/N ratio can be realized. On the other hand, in the related art, the number of counted incident gamma rays is measured. In this constitution, the gamma ray causes Compton scattering with the detector in the gamma ray region, and a part of energy is deposited and passed through the detector. This reaction occupies a large percentage.

Therefore, if only the number of counts is used to measure distance, it is impossible to realize distance measurement, unlike the present system.

Moreover, the present system includes multilayered detection plates 200. Thus, focus can be adjusted by changing the interval between the detection plates 200. Therefore, an appropriate plate interval is set in accordance with the distance to the gamma ray source and spectrum analysis and image analysis can be performed. As a result, the distance and direction can be estimated from the number of gamma rays correctly reacted in the respective layers, with high precision.

The present invention has been described based on the embodiments. Any person skilled in the art can variously change and modify the examples, which would still conceptually represent no substantial variation on theme relating to scope of the present invention.

Moreover, the respective embodiments may be combined and performed, as appropriate. In this case, a combined effect is obtained. Furthermore, the above-described embodiments include various stages of inventions, and various inventions can be extracted by an appropriate combination in a plurality of disclosed constituting elements. For example, even if several constituting elements are removed from all the constituting elements described in the embodiment, the problems described in paragraphs of problems to be solved by the invention can be solved. When at least one of the effects described in the paragraphs of the effect of the present invention is obtained, the constitution from which this constituting element is removed can be extracted as the invention.

What is claimed is:

1. A distance measurement apparatus of an X-ray or gamma ray source using a multilayered radiation detector, comprising:

A plurality of detection plates which disposed along a normal direction and which generate signals on the basis of interaction with incident X-ray or gamma ray photons;

A number count unit which counts each number of the X-ray or gamma ray photons having a predetermined energy and interacting with each of the plurality of detection plates based on the signals generated by each of the plurality of the detection plates; and A distance calculation unit which calculates a distance between the distance measurement apparatus and the X-ray or gamma ray source on the basis of statistical analysis by using each number of the X-ray or gamma ray photons concerning only with photoelectric absorption detected by each of the plurality of detection plates and using each interval distance between the plurality of detection plates.

2. The distance measurement apparatus of the gamma ray source using the multilayered radiation detector according to claim 1, wherein the number count unit detects energies of the X-ray or gamma ray photons.

3. The distance measurement apparatus of the gamma ray source using the multilayered radiation detector according to claim 1, further comprising:
a movement mechanism which moves each of the plurality of detection plates in the normal direction.

4. The distance measurement apparatus of the gamma ray source using the multilayered radiation detector according to claim 1, wherein each of the detection plates includes a scintillator; and the signals are optical signals.

5. The distance measurement apparatus of the gamma ray source using the multilayered radiation detector according to claim 1, wherein each of the detection plates includes a semiconductor; and the signals are electric signals based on electric charges.

6. The distance measurement apparatus of the gamma ray source using the multilayered radiation detector according to claim 5, wherein each of the plurality of detection plates includes: a plurality of hole type electrodes formed at predetermined intervals along first and second directions on the detection plate; and a voltage supply source which is means for supplying a voltage to each of the hole type electrodes and which supplies the voltage assuming that a plurality of predetermined hole type electrodes disposed non-adjacent to each other are anodes and each hole type electrode disposed adjacent to the plurality of anodes is a cathode, and
a sensor element array is formed in the detection plate, in which a plurality of sensor elements including the anode, the plurality of cathodes, and a part of the plate existing between the anode and the plurality of cathodes are arranged in a matrix form.

7. The distance measurement apparatus of the gamma ray source using the multilayered radiation detector according to claim 6, wherein the hole type electrodes are formed along a thickness direction of the plate.

8. The distance measurement apparatus of the gamma ray source using the multilayered radiation detector according to claim 6, wherein each of the sensor elements comprises: one anode; and a plurality of cathodes arranged at equal intervals and arranged at equal distances from the anode.

9. The distance measurement apparatus of the gamma ray source using the multilayered radiation detector according to claim 6, wherein the number count unit detects positions of the interactions on each of the detection plates on the basis of the electric charges collected by each of the electrodes for each of the detection plates and acquires intensity distribution of the X-ray or gamma ray photons on each of the detection plates; and
a direction acquisition unit which acquires the incident direction of the X-ray or gamma ray with respect to the apparatus based on the intensity distribution.

10. A distance measurement apparatus of an X-ray or gamma ray source using a multilayered radiation detector, comprising:
a plurality of charge-coupled imaging devices having a respective plurality of imaging detection plates disposed along a normal direction, which generate signals on the basis of interaction with incident X-ray or gamma ray photons having a predetermined energy and which count the each number of the X-ray or gamma ray photons interacting with each of the plurality of the charge-coupled imaging plates based on the signals; and
a calculation unit which calculates a distance between the distance measurement apparatus and the X-ray or gamma ray source on the basis of statistical analysis by using each number of the X-ray or gamma ray photons concerning only with photoelectric absorption detected by each of the plurality of image detection plates and using each interval distance between the plurality of charged-coupled imaging plates.

11. The distance measurement apparatus of the gamma ray source using the multilayered radiation detector according to claim 10, wherein the calculation unit which acquires intensity distribution of the X-ray or gamma ray photons on each of the detection plates, calculates an incident direction of the ray with respect to the apparatus on the basis of each number of the X-ray or gamma ray photons and the intensity distribution.

12. The distance measurement apparatus of the gamma ray source using the multilayered radiation detector according to claim 10, wherein each of the charge-coupled imaging plates detects energies of the X-ray or gamma ray photons.

13. The distance measurement apparatus of the gamma ray source using the multilayered radiation detector according to claim 10, further comprising:
a movement mechanism which moves each of the plurality of charge-coupled imaging plates in the normal direction.

14. The distance measurements apparatus according to claim 1, wherein a predetermined evaluation function is used in the statistical analysis.

15. The distance measurement apparatus according to claim 1, wherein a minimum square method is used in the statistical analysis.

16. The distance measurement apparatus according to claim 10, wherein a predetermined evaluation function is used in the statistical analysis.

17. The distance measurement apparatus according to claim 10, wherein a minimum square method is used in the statistical analysis.

* * * * *